(12) United States Patent
Ku

(10) Patent No.: US 6,439,716 B1
(45) Date of Patent: Aug. 27, 2002

(54) SPECTACLES

(75) Inventor: Otis Ku, Kowloon (CN)

(73) Assignee: Sun Hing Optical Manufactory Limited, Kowloon (CN)

( * ) Notice: Subject to any disclaimer, the term of this patent is extended or adjusted under 35 U.S.C. 154(b) by 0 days.

(21) Appl. No.: 09/843,015

(22) Filed: Apr. 26, 2001

(51) Int. Cl.$^7$ .............................. G02C 5/08; G02C 5/20; G02C 5/14

(52) U.S. Cl. .................... 351/63; 351/111; 351/115; 351/119

(58) Field of Search ................................. 351/153, 140, 351/63, 41, 111, 115, 119; 2/454; 16/228

(56) References Cited

U.S. PATENT DOCUMENTS 5,596,789 A * 1/1997 Simioni ...................... 351/153

* cited by examiner

*Primary Examiner*—Hung Xuan Dang
(74) *Attorney, Agent, or Firm*—Alix, Yale & Ristas, LLP

(57) ABSTRACT

A pair of spectacles having a curved lens body having opposite ends, and a pair of curved left and right arms connected to the opposite ends of the body. A hinge connection at each end of the body connects the corresponding arm for pivotal movement of the arm relative to the body to enable opening and closing of the spectacles. A swivel connection associated with each arm allows the arm to be turned from a normal position to a reversed position for lying close to the body, with the arm being curved in the same direction as the body.

10 Claims, 3 Drawing Sheets

// SPECTACLES

BACKGROUND OF THE INVENTION

The present invention relates to a pair of spectacles that can be converted into a relatively smaller size for storage.

It is conventional that the arms of a pair of spectacles are foldable onto the spectacle body for storage. In certain designs, the arms are curved -or convex outwards and form a generally circular shape with the spectacle body when the spectacles are in use, such that the spectacles may extend closely round the front and opposite sides of the wearer's head. Spectacles of this type, in particular, tend to be thick when the arms are folded forming a double convex shape, and are therefore not space efficient.

The invention seeks to mitigate or at least alleviate such a problem by providing a pair of Spectacles having a different construction.

SUMMARY OF THE INVENTION

According to the invention, there is provided a pair of spectacles having a body comprising a lens and having opposite ends, said body being curved, and a pair of left and right arms connected to the opposite ends of the body, each side arm being also curved. A hinge connection at each end of the body connects the corresponding arm for pivotal movement of the arm relative to the body to enable opening and closing of the spectacles. A swivel connection associated with each arm allows the arm to be turned from a normal position to a reversed position for lying close to the body, with the arm being curved in the same direction as the body.

Preferably, each swivel connection is provided immediately adjacent the corresponding hinge connection.

It is preferred that each swivel connection is provided between the associated arm and the corresponding hinge connection.

It is further preferred that each swivel connection is provided immediately adjacent the corresponding hinge connection.

In a specific construction, the hinge connection at each end of the body is formed by first and second parts, and the corresponding swivel connection is formed by the second part and a third part, said three parts being connected sequentially together.

In a preferred embodiment, each swivel connection is formed by first and second parts, including elements inter-engageable to lock the swivel connection and in turn the corresponding arm in at least the normal position.

More preferably, the elements are provided by integral portions of the first and second parts of the swivel connection.

Further more preferably, the elements are in the form of a protrusion and a recess having complementary shapes for mating inter-engagement.

It is preferred that each swivel connection includes a resilient element for biasing the, inter-engageable elements of the first and second parts into engagement.

It is further preferred that the first part of each swivel connection is formed with a hole containing the resilient element, and the second part includes a elongate member inserted into the hole and engaged. with the resilient element for action thereby.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
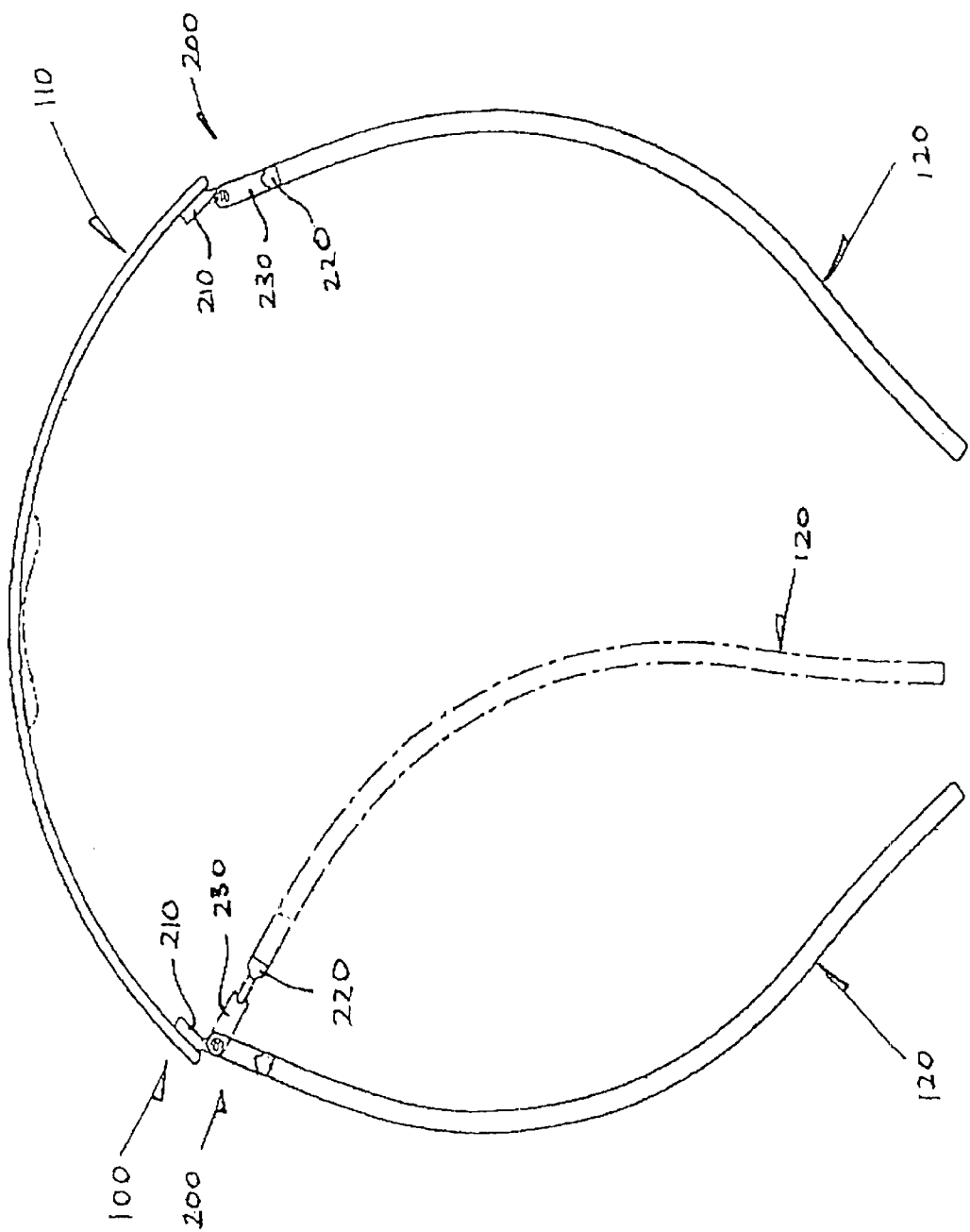
FIG. 1 is a top plan view of a pair of spectacles in accordance with the invention, which is shown in an open condition.
Figure 2:
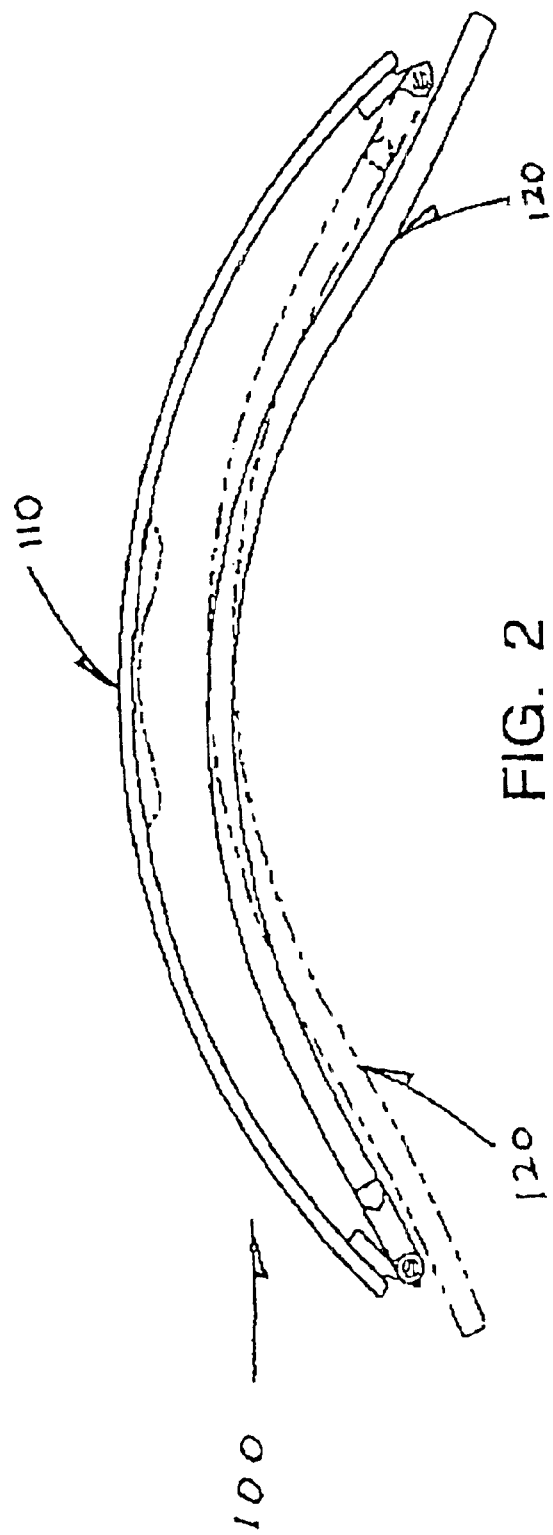
FIG. 2 is a top plan view of the spectacles of FIG. 1, which is shown in a closed condition.

Referring initially to FIGS. 1 and 2 off the drawings, there is shown a pair of spectacles 100 embodying the invention, which spectacles 100 comprise a lens body 110 and a pair of left and right horizontal arms 120 connected to opposite ends of the lens body 110. In this particular example, the spectacles 100 are sunglasses, and the lens body 110 is a unitary lens for both eyes.

The sunglasses 100 are designed to extend closely around the front and opposite sides of the wearers head. For this purpose, both the lens 110 and the arms 120 are curved or arcuate about an imaginary vertical plane, being outwardly convex to form a generally circular shape in the open condition of the sunglasses 100.

Figure 3:
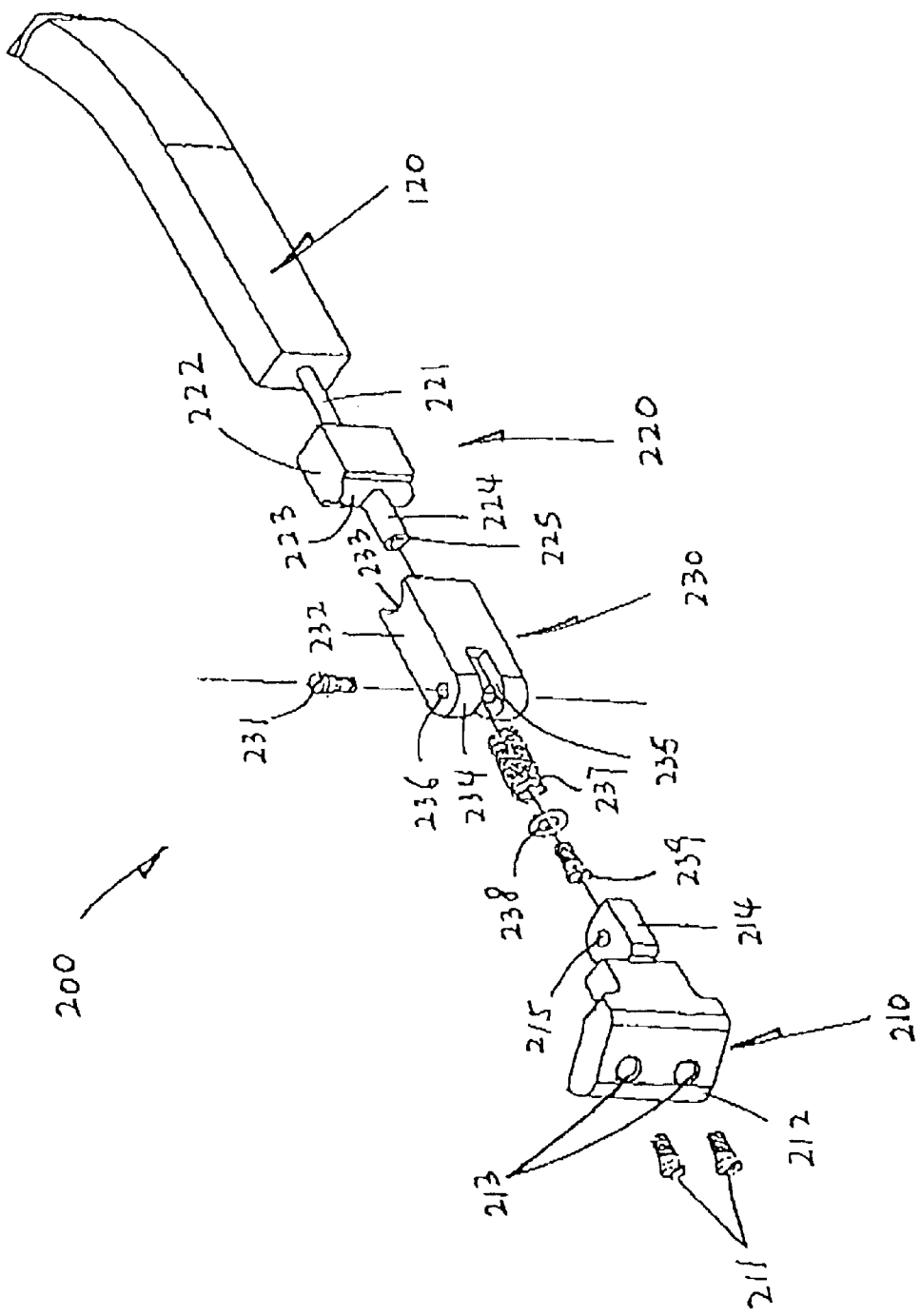
FIG. 3 is an exploded perspective view of a hinge connecting an arm of the spectacles of FIG. 1 to the spectacle body.

FIG. 3 shows a hinge 200 for connecting the front end of the left arm 120 to the corresponding end of the lens 110. The other hinge, for the right arm 120, is simply a mirror image of the hinge 200 shown in the Figure. The hinge 200 comprises a front part 210 which is secured by means of two screws 211 to the lens 110, a rear part 220 which is fixedly joined to the arm 120 by a horizontal rod 221, and an intermediate part 230 which connects the front and the rear parts 210 and 220.

The front part 210 has a bracket-like first body 212 formed with two screw-threaded holes 213 into which the screws 211 are tightened through the lens 110. The first body 212 includes an integral flat tail in the form of a horizontal lug 214 having a vertically extending hole 215.

The rear part 220 has a block-like second body 222 having a flat rear surface connected with the rod 221 and a front surface. The front surface has the form of a vertically extending, semi-cylindrical protrusion 223. A stud 224 having an internally screw-threaded front end 225 projects horizontally forward from protrusion 223.

The intermediate part 230 has an oblong third body 232 which has a rear surface shaped to form a vertically extending semi-cylindrical recess 233. The recess 233 and the aforesaid protrusion 223 have complementary shapes for mating inter-engagement. The third body 232 includes a bifurcate front end 234 having a horizontal gap 235 for receiving the aforesaid lug 214 and a vertically extending screw-threaded hole 236. A screw 231 extends through hole 236 and hole 215 of the lug 214, whereby the intermediate part 230 is connected to the front part 210 for relative horizontal pivotal movement about the screw 231.

Such a pivotal movement at each end of the lens 110 constitutes a hinging action which enables folding of the corresponding arm 120 relative to the lens 110 for opening and closing of the sunglasses 100.

The third body 232 is formed with a longitudinally extending central hole or internal passage 229 that extends along the bottom of the gap 235 to the recess 233. A compression spring coil 237 is contained within the passage 229 and stud 224 extends forwards into the passage 229.

The spring 237 has a rear end retained by a restricted rear end of the passage, and a front end abutted by a washer 238.

The washer 238 is just sufficiently small to slide co-axially along the passage 229. A screw 239 is inserted through the washer 238 and coil 237 and subsequently engages with the screw-threaded front end 225 of the stud 224. The coil 237 acts with the washer 238, the front end 225 of the stud 224, and the restricted rear end of the passage, whereby the stud 224 is resiliently biased forwards within the passage.

The coil 237 serves to resiliently bias the rear and intermediate parts 220 and 230 together, such that protrusion 223 and recess 233 come into mating inter-engagement. In this condition, the arm 120 is locked in a normal position for use (solid lines of FIG. 1).

The arm 120 may be pulled slightly rearwards, against the action of the coil 237, to disengage the protrusion 223 of rear part 220 from the recess 233 of intermediate part 230, whereupon the arm 120 is free to rotate about the stud 224. In particular, the arm 120 can be turned in either direction through an angle of 180° and then released to allow the protrusion 223 to re-engage with the recess 233 for locking in the reversed relative position. In this condition, the arm 120 (dashed lines of FIG. 1) is curved in the same direction as the lens 110, such that the arm 120 can be pivoted to lie close alongside the lens 110 (FIG. 2) for storage.

Such a swivelling movement at each end of the lens 110 may be regarded as another hinging action to enable folding of the corresponding arm 120 closer to the lens 110 for reducing the size of the sunglasses 100 for storage.

It is clear that in the storage condition (FIG. 2) the arms 120 lie comparatively much closer to the lens 110 than they will be if they are folded while in the normal position (FIG. 1) curved in the opposite direction as the lens 110.

The invention has been given by way of example only, and various modifications of and/or alterations to the described embodiment may be made by persons skilled in the art without departing from the scope of the invention as specified in the appended claims.

What is claimed is:

1. A pair of spectacles comprising:
    a curved body having a lens and opposite ends,
    a pair of curved left and right arms connected to the opposite ends of the body,
    a hinge connection at each end of the body connecting the corresponding arm for pivotal movement of the arm relative to the body to enable opening and closing of the spectacles, and
    a swivel connection associated with each arm, and separate from the hinge connection, to allow the arm to be turned from a normal position to a reversed position for lying close to the body, with the arm being curved in the same direction as the body.

2. The pair of spectacles as claimed in claim 1, wherein each swivel connection is provided immediately adjacent the corresponding hinge connection.

3. The pair of spectacles as claimed in claim 1, wherein each swivel connection is provided between the associated arm and the corresponding hinge connection.

4. The pair of spectacles as claimed in claim 3, wherein each swivel connection is provided immediately adjacent the corresponding hinge connection.

5. The pair of spectacles as claimed in claim 1, wherein the hinge connection at each end of the body is formed by first and second parts, and the corresponding swivel connection is formed by the second part and a third part, said three parts being connected sequentially together.

6. The pair of spectacles as claimed in claim 1, wherein each swivel connection is formed by first and second parts, including elements inter-engageable to lock the swivel connection and in turn the corresponding arm in at least the normal position.

7. The pair of spectacles as claimed in claim 6, wherein the elements are provided by integral portions of the first and second parts of the swivel connection.

8. The pair of spectacles as claimed in claim 7, wherein the elements are in the form of a protrusion and a recess having complementary shapes for mating inter-engagement.

9. The pair of spectacles as claimed in claim 6, wherein each swivel connection includes a resilient element for biassing the inter-engageable elements of the first and second parts into engagement.

10. The pair of spectacles as claimed in claim 9, wherein the first part of each swivel connection is formed with a hole containing the resilient element, and the second part includes a elongate member inserted into the hole and engaged with the resilient element for action thereby.

* * * * *